United States Patent
Samuel et al.

(10) Patent No.: US 9,495,711 B2
(45) Date of Patent: Nov. 15, 2016

(54) INVITE ABUSE PREVENTION

(75) Inventors: Arjmand M. Samuel, Redmond, WA (US); Sameer Halai, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 12/950,219

(22) Filed: Nov. 19, 2010

(65) Prior Publication Data
US 2012/0131171 A1 May 24, 2012

(51) Int. Cl.
G06F 15/173 (2006.01)
G06Q 50/00 (2012.01)
G06Q 10/10 (2012.01)

(52) U.S. Cl.
CPC ............ G06Q 50/01 (2013.01); G06Q 10/107 (2013.01)

(58) Field of Classification Search
CPC .............................. G06Q 50/01; G06Q 10/107
USPC .................................................. 709/223–226
See application file for complete search history.

(56) References Cited

U.S. PATENT DOCUMENTS

| | | | |
|---|---|---|---|
| 2004/0122803 A1 | 6/2004 | Dom et al. | |
| 2005/0171954 A1* | 8/2005 | Hull et al. | 707/10 |
| 2008/0147742 A1* | 6/2008 | Allen | 707/104.1 |
| 2009/0119603 A1* | 5/2009 | Stackpole | 715/753 |
| 2009/0235335 A1* | 9/2009 | Mendiola | 726/4 |
| 2009/0319363 A1* | 12/2009 | Callaghan | G06Q 20/10 705/14.36 |
| 2011/0054269 A1* | 3/2011 | Lee et al. | 600/300 |
| 2011/0295826 A1* | 12/2011 | McLellan | 707/706 |

(Continued)

FOREIGN PATENT DOCUMENTS

| | | |
|---|---|---|
| CN | 101540739 | 9/2009 |
| CN | 101911066 | 12/2010 |
| WO | WO-2009088671 | 7/2009 |

OTHER PUBLICATIONS

Mislove, et al., "Ostra: Leveraging Trust to Thwart Unwanted Communication", Retrieved at << http://cs.northwestern.edu/~akuzma/classes/CS495-s09/doc/Ostra%20Leveraging%20trust%20to%20thwart%20unwanted%20communication.pdf , Proceedings of the 5th USENIX Symposium on Networked Systems Design and Implementation, 2008, pp. 16.

(Continued)

*Primary Examiner* — Joseph Greene
(74) *Attorney, Agent, or Firm* — Anand Gupta; Tom Wong; Micky Minhas

(57) ABSTRACT

Techniques for invite abuse prevention are described. In an implementation, data that describes mutual activities of the clients with one or more resources available via a service provider is obtained from multiple clients. The service provider may use this data regarding mutual activities to ascertain activity scores between clients that interact directly. The ascertained activity scores may then be used to compute a score between two subject clients to control invites and/or other interactions between the clients. Computing the score may include determining one or more connections between the two clients through clients that interact directly, calculating candidate values for the one or more connections, and selecting one of the candidate values as the computed score using various techniques. The computed score may be used in various ways to control invites and/or other interactions between the clients using the one or more resources.

20 Claims, 5 Drawing Sheets

(56) References Cited

U.S. PATENT DOCUMENTS

2012/0072382 A1* 3/2012 Pearson et al. ............... 706/13

OTHER PUBLICATIONS

Wilson, et al., "User Interactions in Social Networks and their Implications", Retrieved at http://www.cs.ucsb.edu/~alessandra/papers/interaction-eurosys09.pdf >>, Proceedings of the 4th ACM European conference on Computer systems, Apr. 1-3, 2009, pp. 14.
Ali, et al., "Agent-based User-Profiling Model for Behavior Monitoring", Retrieved at http://ieeexplore.ieee.org/stamp/stamp.jsp?tp=&arnumber=5189888 >>, Proceedings of the 2009 International Conference on Future Networks, Mar. 7-9, 2009, p. 3-7.
Kazienko, et al., "Evaluation of Node Position Based on Mutual Interaction in Social Network of Internet Users", Retrieved at http://www.cs.put.poznan.pl/kkntpd/tpd_pliki/publikacja/pub/20.pdf >>, Sep. 26, 2007, p. 266-276.
Sirivianos, et al., "SocialFilter: Introducing Social Trust to Collaborative Spam Mitigation", Retrieved at http://www.usenix.org/event/collsec10/tech/full_papers/Sirivianos.pdf, Aug. 13, 2010, pp. 6.
Conitzer, et al, "False-Name-Proofness in Social Networks", Retrieved at http://www.cs.duke.edu/~conitzer/fnp_social_networks.pdf, 2010, p. 1-17.
"Foreign Office Action", CN Application No. 201110367794.1, Nov. 5, 2014, 10 Pages.
"Foreign Office Action", CN Application No. 201110367794.1, Jul. 10, 2015, 9 Pages.
Foreign Office Action, CN Application No. 201110367794.1, Mar. 11, 2014, 14 Pages.

\* cited by examiner

200 ↘

202
Calculate a score indicative of mutual activities between clients that use a social network service from a service provider

↓

204
Utilize the score to control social network activities between the clients

*Fig. 2*

INVITE ABUSE PREVENTION

BACKGROUND

The popularity of social networking via online networking sites/services is ever increasing. People may use social networking sites in various ways such as to keep in contact with friends, establish new relationships with others, post status updates, and share information such as, recommendations, pictures, and discussions with other people.

To establish relationships in social networks, users may send and receive invitations to become part of each other's network. When an invitation is accepted, the users become "friends" and may then communicate and share information. Unfortunately, this mechanism may be abused by attackers (e.g., spammers) who may establish accounts and send out invitations in bulk for illegitimate and/or undesirable purposes. The attackers often use attractive and familiar names that may mislead some of the invitees into accepting the invitations. Once the attacker and the victim invitee become friends, the attacker may engage in "spamming" by sending out unsolicited messages, posts, recommendations, and so forth. These unsolicited "spam" messages may contain malware, URLs to phishing sites, links to shady sites, unwanted commercial content, and/or other questionable material referred to collectively as spam messages or just spam. Consequently, one challenge that is faced by a provider seeking to maintain and/or increase the popularity of a social networking site is controlling unsolicited messages from spammers.

SUMMARY

Techniques for invite abuse prevention are described. In an implementation, data is obtained from multiple clients that describes mutual activities of the clients with one or more resources available via a service provider. The service provider may use the data regarding mutual activities to ascertain activity scores between clients that interact directly. The ascertained activity scores may then be used to compute a score between two subject clients, e.g., "potential friends," to control invites and/or other interactions between the clients. Computing the score may include determining one or more connections between the two clients through clients that interact directly, calculating candidate values for the one or more connections, and selecting one of the candidate values as the computed score using various techniques. The computed score may be used in various ways to control invites and/or other interactions between the clients using the one or more resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 a flow diagram depicting a procedure in an example implementation in which scores based on mutual activities are used to control client interaction.

DETAILED DESCRIPTION

Overview

To establish relationships in social networks, users may send and receive invitations to become part of each other's network. When an invitation is accepted, the users become "friends" and may then communicate and share information. Unfortunately, this mechanism may be abused by attackers (e.g., spammers) who may establish accounts and send out invitations in bulk for illegitimate and/or undesirable purposes.

Techniques for invite abuse prevention are described. In an implementation, data is obtained from multiple clients that describes mutual activities of the clients with one or more resources available via a service provider. The service provider may use the data regarding mutual activities to ascertain activity scores between clients that interact directly. The ascertained activity scores may then be used to compute a score between two subject clients, e.g., "potential friends," to control invites and/or other interactions between the clients. Because the score measures closeness between a first client and a second client in a network, the score may be referred to herein as a Mutual Activity-Based Network Closeness (MANC) score or just "closeness" score.

Computing the closeness score may include determining one or more connections between two clients through friends of the clients that interact directly, calculating candidate values for the one or more connections, and selecting one of the candidate values as the closeness score using various techniques. The computed closeness score may be used in various ways to control invites and/or other interactions between the clients using the one or more resources. For instance, invites between clients may be blocked when the closeness score does not satisfy a threshold value defined to control invites. In another example updates, posts, and other content from different friends may be prioritized, highlighted, flagged, sorted, arranged, filtered, or otherwise be differentiated between using corresponding closeness scores. For instance, an update feed may be configured to present updates from "closest" and hide other updates based on the computed closeness scores.

In the discussion that follows, a section titled "Example Environment" describes an example environment and devices, which may be employed to provide invite abuse prevention in various embodiments. Following this, a section titled "Example Procedures" describes example techniques related to invite abuse prevention in accordance with one or more embodiments. This section also describes some example ways in which an activity score associated with clients may be employed to control interactions between the clients. Last, a section titled "Example System" is provided and describes example computing systems and devices that may be used to implement one or more embodiments of techniques for invite abuse prevention.

Example Environment

Figure 1:
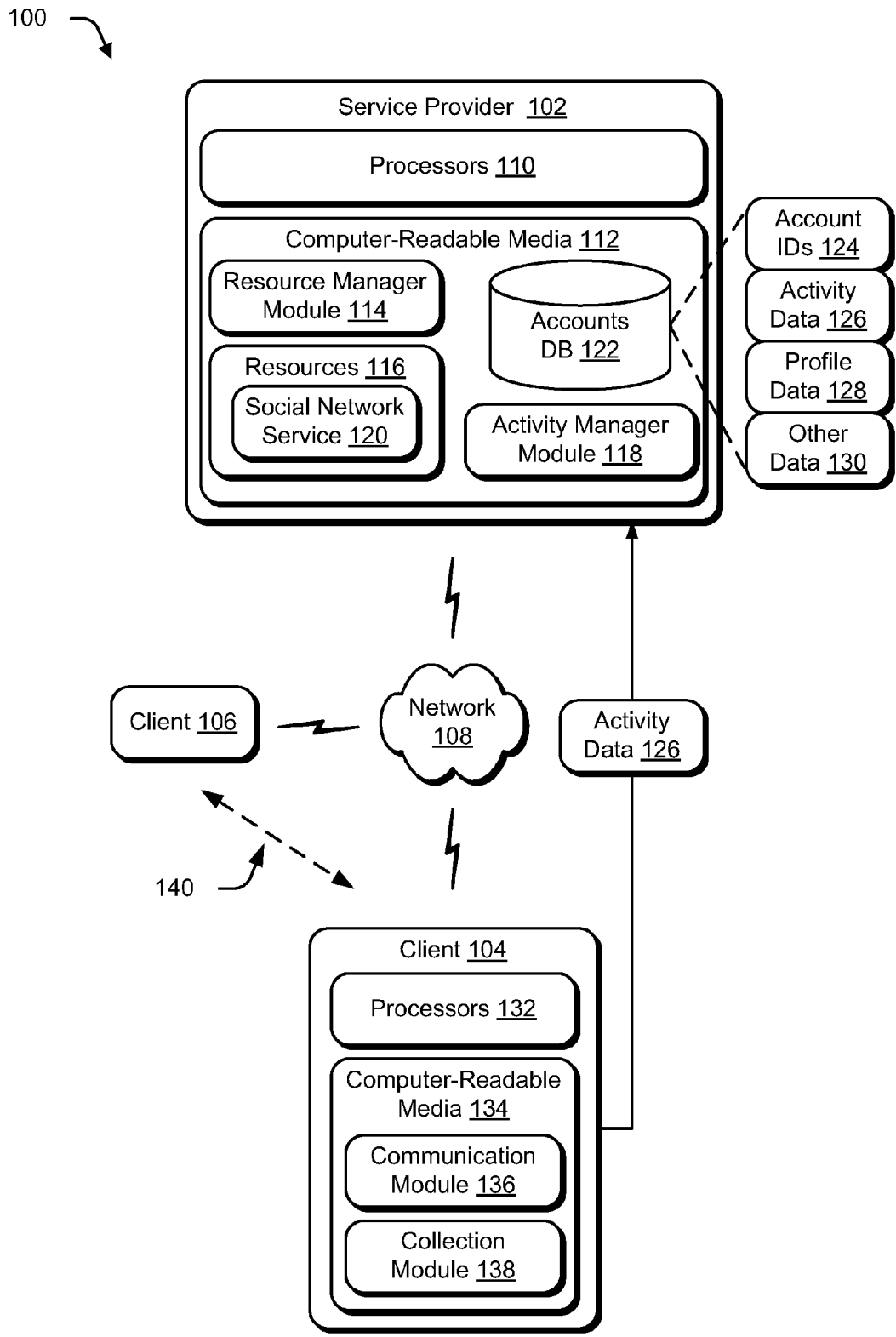
FIG. 1 is an illustration of an environment in an example implementation that is operable to provide invite abuse prevention.

FIG. 1 is an illustration of an example environment 100 that is operable to provide invite abuse prevention. The illustrated environment includes a service provider 102, a client 104, and a client 106 that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. The service provider 102, client 104, and client 106, may be implemented by respective computing systems, which each may incorporate one or more devices and may be configured in a variety of ways. Some example computing systems and devices are described below in relation to FIG. 5.

The clients 104, 106 may each be configured as a computing device that is capable of communicating over the network 108, such as a desktop computer, a mobile station, an entertainment appliance, a set-top box communicatively coupled to a display device, a wireless phone, a game console, a tablet computer, a netbook, and so forth. Thus, the clients 104, 106 may range from full resource devices with substantial memory and processor resources (e.g., personal computers, game consoles) to low-resource devices with limited memory and/or processing resources (e.g., traditional set-top boxes, hand-held game consoles). The clients 104, 106 may also relate to an entity that operates the client devices 104, 106. In other words, client devices 104, 106 may describe logical clients that include software as well as hardware that is used to execute the software, e.g., one or more processors, functional blocks, and so on.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and one or more computer-readable media 112, which may be configured in various ways. Computer-readable media as used herein may include, by way of example and not limitation, all forms of volatile and non-volatile memory and/or storage media/devices that are typically associated with a computing device. Such media may include ROM, RAM, flash memory, hard disk, removable media, fixed logic circuits, and the like. Computer-readable media may include both "computer-readable storage media" and "communication media," examples of which can be found in the discussion of the example computing system of FIG. 5.

The service provider 102 is depicted as storing a resource manager module 114 on the computer-readable media 112 that is executable via the one or more processors 110. The service manager module 114 represents functionality operable by the service provider 102 to manage various resources 116 that may be made available over the network 108. For example, various resources 116 may be provided via web pages or other user interfaces that are communicated over the network for output by one or more clients. The resource manager module 114 may manage access to the resources 116, performance of the resources, configuration of webpages to provide the resources 116, and so on.

The service provider 102 is further depicted as storing an activity manager module 118 that may be executable via the one or more processors 110 to implement "server-side" aspects of invite abuse prevention described herein. For instance, the activity manager module 118 represents functionality operable to obtain various data from the clients 104, 106 and employ the data to compute scores indicative of mutual activities in which the clients engage. The scores may be used to control invites, social network activities, and or other interactions between various clients as is described further in reference to the following figures.

Resources 116 made accessible by a service provider 102 may include any suitable combination of services and/or content typically made available over a network by one or more providers. Some examples of services include, but are not limited to, a search service, an email service to send and receive email, an instant messaging service to provide instant messages between a client 104 and one or more other clients 106, and an authentication service to control access of the clients to the resources 116. Additional examples of services include a shopping service, a weblog service, productivity service, a news service, and an advertisement service to name a few. Content may include various combinations of text, video, ads, audio, multi-media streams, animations, images, web pages, web applications, device applications, content for display by a browser or other device application, and so on.

The authentication service may be provided by the resource manager module 114 to authenticate clients to access various resources 116 that may be provided by one or more of the service providers 102. For example, a client 104 may provide a username and password that is authenticated by the authentication service. When the authentication is successful, the authentication service may pass a token, or other suitable data, to enable access to corresponding resources 116. Authentication of the client 104 to an account (e.g., "a single sign-on") may provide access to a single corresponding service provider 102, service, and/or resource 116. Additionally or alternatively, a single authentication may correspond to multiple resources, such that authentication to a single account provides access to many service providers 102 and/or to many resources 116 including an entire suite of services.

A further example of a resource 116 that may be provided by a service provider 102 is a social network service 120 as depicted in FIG. 1. The social network service 120 is representative of functionality to facilitate connections and interactions between groups of users who share common interests and activities. The social network service 120 may assist users in connecting to a group, provide a variety activities and ways for users to interact (e.g., group email, website, blog, messaging) and provide recommendations to the groups based on shared interests and activities. In at least some embodiments, the social network service 120 may also be configured to enable techniques for invite abuse prevention described herein.

The resource manager module 114 may also manage an accounts database 122 that may be configured to store a variety of data related to user accounts with the one or more service providers 102. By way of example and not limitation, accounts database 120 is depicted as storing account identifiers 124 that may be used for authentication and access control (e.g., unique account IDs, usernames, pass-words, and so on), activity data 126 that may describe mutual activities that occur between clients, and profile data 128 that may correspond to personal information and webpages accessible through a social network service 120 and/or other services. A variety of other data 130 is also contemplated, including service authorizations, user preferences, program files such as documents, pictures, and spreadsheets maintained online, users' contact or "friend" data, and other data typically associated with user accounts.

The example client 104 is depicted as having one or more processors 132 and computer-readable media 134. The computer-readable media 134 is also depicted as storing a communication module 136 and a collection module 138 that are executable via the one or more processors 132. The collection module 138 represents functionality to implement "client-side" aspects of invite abuse protection described herein. For example, the collection module 138 may be configured to collect activity data 126 regarding activities 140 of the client 104 with other clients 106. As illustrated, the collection module 138 may communicate activity data 126 over the network 108 to the service provider 102. At the service provider 102, the activity manager module 118 may be configured to obtain, store, process and/or utilize the activity data 126 obtained from multiple clients in various ways to control client interaction with the social network service 120 and/or other resources 116, as described above and below.

The communication module 136 represents functionality to enable various communications over the network 108. For example, the communication module 136 may be implemented as a browser or other suitable application to obtain and output webpages from the service provider 102 over the network 108. The communication module 136 may also represent a component of another application used to obtain one or more resources 116 from the service providers 102. For example, the communication module 136 may be configured as a component of a desktop social networking application of a client 104.

The communication module 136 is executable via the processor 132 to provide various interactions with service providers 102 and/or resources 116. Examples of such interaction include, but are not limited to, communicating one to another, navigating content, searching webpages, accessing resources 116, interacting with a social networking site, performing searches, downloading content, using various services, managing accounts, and so forth. The interaction may also include engaging in different activities 140 with other clients 106 through the resources 116 that are provided by the service provider 114. Example of activities 140 include but are not limited to email, instant messaging, sharing pictures, sharing videos, audio chats, and video chats, to name a few.

Having considered devices and components of an example environment, consider now example procedures for invite abuse prevention that may be implemented in the environment using the example components, as well as in other environments.

Example Procedures

The following discussion describes techniques for invite abuse prevention that may be implemented utilizing the systems and devices described above and below. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. While some techniques are described herein in relation to social network service 120, the described techniques are applicable to a variety of resources 116 from a service provider 102, including the example kinds of resources (e.g., service and content) discussed herein. In portions of the following discussion, reference may be made to the example environment 100 of FIG. 1.

FIG. 2 depicts a procedure 200 in an example implementation in which scores based on mutual activities are used to control client interaction. In at least some embodiments, procedure 200 may be performed by a suitably configured service provider, such as service provider 102 of FIG. 1 having a activity manager module 118. Additionally or alternatively, procedure 200 may be performed by a collection module 138 that is deployed to a client 104, or by a client 104 and service provider 102 in combination.

A score is calculated that is indicative of mutual activities between clients that use a social networking service from a provider (block 202). For instance, collection modules 138 deployed to clients may be configured to gather activity data 126 regarding activities with other clients via the social network service 120 and/or in connection with other resources 116 available from a service provider 102. The activity manager module 118 may operate to obtain the collected data from the clients. For instance, the activity manager module 118 may facilitate upload of activity data by the clients to the accounts database 122 or another suitable central repository. The upload of activity data to a central repository may occur in various ways including automatically at a configurable time interval, on demand by requesting data from particular clients, upon initiation by one or more clients, and so forth.

Activity manager module 118 may further operate to process activity data that is associated with particular clients 104, 106 to arrive at an activity score indicative of mutual activities between the clients 104, 106. Because the score measures activity between clients in a network that interact directly, the score may be referred to as an activity score. In general, the activity score is configured as a measure of two-way interaction of two individual clients (e.g., a client pair that includes a first client and a second client) or two groups of clients one to another based upon activities in which the clients engage. Groups may be used to simplify calculation by organizing closely related clients into corresponding groups and using the groups to perform the scoring. Groups of clients may be formed based on various criteria such as shared group memberships, common interests, an amount of mutual activities, shared contacts, locations, demographic data, and so forth. In at least some cases, group calculations may use less processing than computing scores for individual client pairs, although both approaches are viable as well as combination of the two approaches.

Thus, individual activity scores can be computed between two clients or groups in a social network of clients according to the activity data that describes direct interaction of the client or groups. Given the individual activity scores, a score between two subject clients (e.g., "potential friends") may be computed based upon the activity scores using a variety of different techniques. This can occur for example when a first client 104 sends an invite seeking to become a friend of a second client 106. The score may be configured as a measure of closeness between clients in the network, including clients that may not interact directly. To differentiate from the activity score, this score may be referred to as a Mutual Activity-Based Network Closeness (MANC) score or just closeness score. Details regarding different example techniques that may be used to compute a closeness score based upon individual activity scores for client pairs and/or groups are discussed in relation to the following figures. Note that for clients that interact directly, the activity score and the closeness score may effectively be the same. In other words, the closeness score may be taken directly as the activity score for those clients that already have direct relationships.

Once a score is calculated for two clients, the calculated score is utilized to control social network activities between the clients (block 204). For instance, the activity manager module 118 may be implemented to selectively enable or disable activities between clients based upon an activity score or a closeness score that is computed for the clients. This may include blocking or allowing invites from one client to another based on the closeness score assigned to potential friends.

Controlling social network activities may also include using activity scores and/or closeness scores to differentiate between different clients/friends and corresponding information associated with the clients/friends, such as posts, status updates, invites, messages, alerts, recommendations. In particular, information from different clients may be prioritized, highlighted, flagged, sorted, arranged, filtered, or otherwise be differentiated between using the scores. For instance, the social network service 120 may be configured to use the scores to identify the "closest" friends of a particular client 104. In general, the closest friends of a particular client 104 are friends with which the particular client 104 may engage in more frequent and/or meaningful mutual activities relative to other friends. The closest friends of a client 104 may be defined in various ways using the scores indicative of mutual activities. This may include setting a configurable number or percent of friends to include as closest friends (e.g., top ten or top five percent) and using activity scores to select a corresponding number/percent of friends with the highest scores as the closest friends. In another example, closest friends may be selected as those clients having scores that satisfy (e.g., meet or exceed) a configurable threshold activity score set to determine closest friends. Information from "closest" friends may be used more prominently than information from other friends throughout the social network service 120 and/or other services from a service provider 102. For example, one or more portions of a user interface configured to provide social network service 120 may be arranged to differentiate between information from closest friends and information from other friends.

In one particular example, a update feed (e.g., a "What's New" feed) provided by a service provider 102 to a client 104 may be configured to automatically show updates and/or posts from "closest" friends and/or hide updates from other friends based on corresponding scores. In another example, the update feed may be configured to enable filtering based on the scores. In this case, a client 104 may be able to selectively show or hide updates, posts, and/or other social network information based on selected closeness levels that correspond to different scores. In some additional examples, a social network service 120 may use a client's "closest" friends as determined using the scores to pre-populate a contact or favorites list, provide relevant content recommendations, and/or selectively arrange portions of a user interface for the social network service 120 to display information related to the closest friends more prominently. In this way, information from friends that interact with each other more often may be surfaced to one another more prominently in feeds, lists, message boards, inboxes, and so forth.

A variety of other examples are also contemplated. Thus, activity and/or closeness scores can be employed in a variety of ways to control social network activities between the clients, some additional examples of which are discussed in relation to the following figures.

Figure 3:
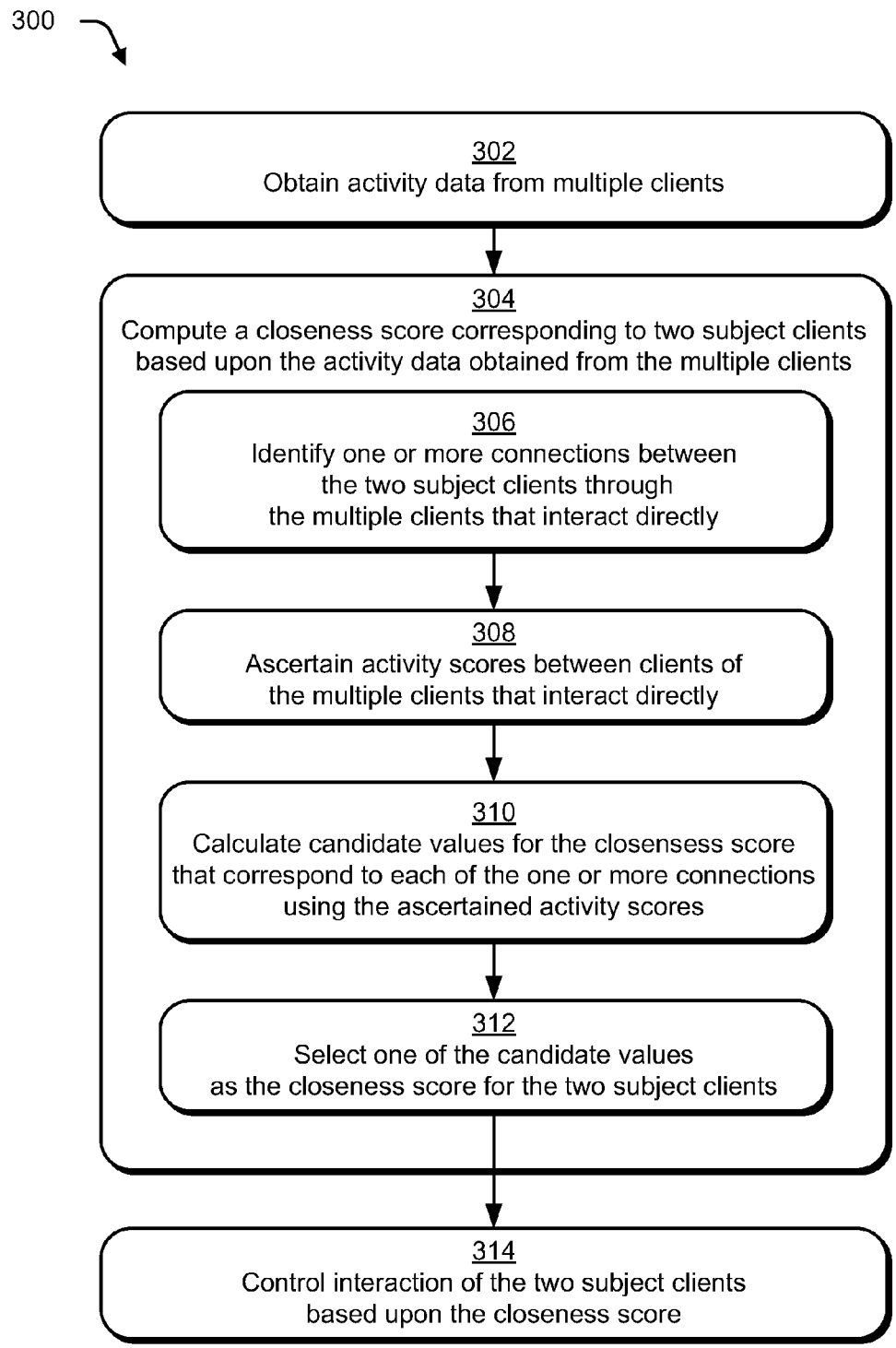
FIG. 3 is a flow diagram depicting a procedure in an example implementation in which a closeness score indicative of mutual interaction between subject clients is calculated.
Figure 4:
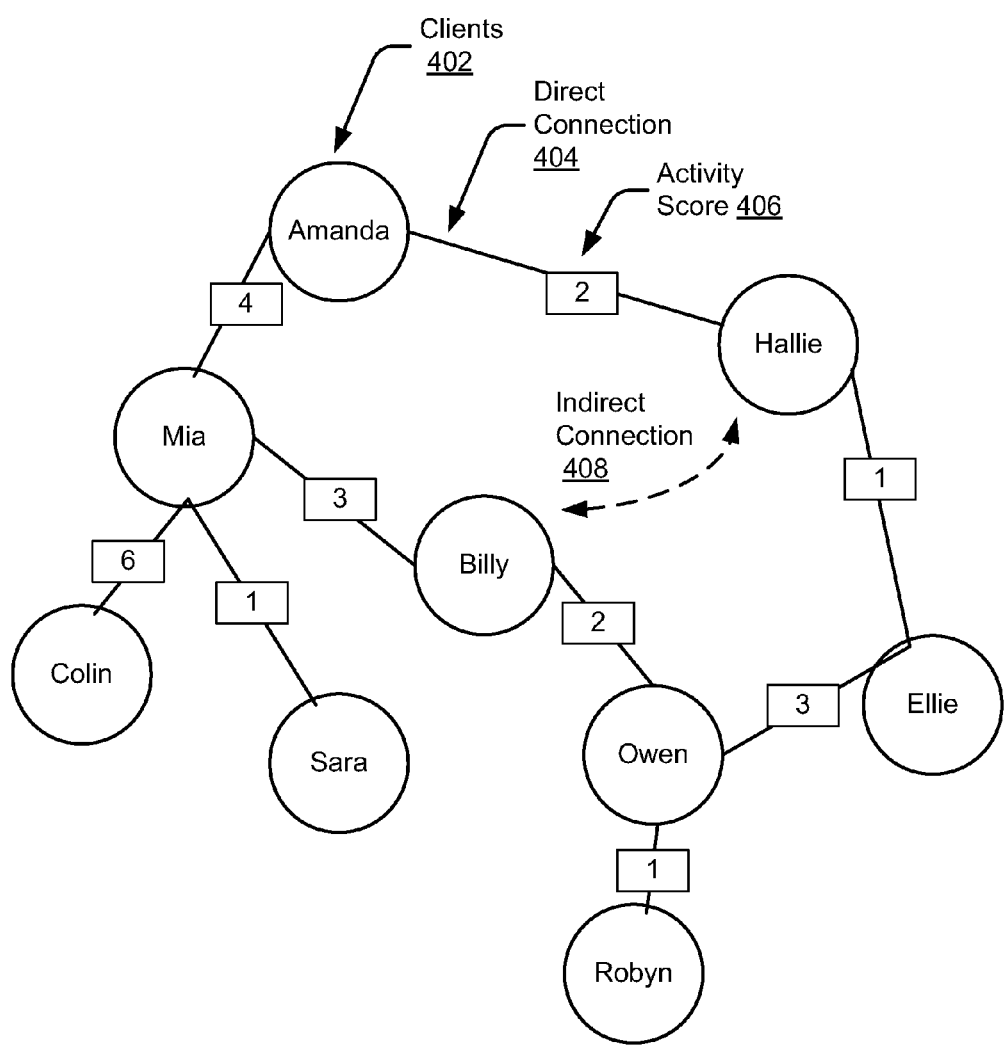
FIG. 4 is a diagram depicting an example representation of a client network.

FIG. 3 depicts a procedure 300 in an example implementation in which a closeness score indicative of mutual interaction between subject clients is calculated. In at least some embodiments, procedure 300 may be performed by a suitably configured service provider, such as service provider 102 of FIG. 1 having an activity manager module 118. Additionally or alternatively, at least some portions of procedure 300 may be performed by a collection module 138 that is deployed to a client 104, or by a client 104 and service provider 102 in combination. In portions of the following discussion, reference may be made to an example representation of a client network that is depicted in FIG. 4.

Activity data is obtained from multiple clients (block 302). For instance, an activity manager module 118 of a service provider 102 may interact with collection modules 138 deployed to clients to obtain activity data 126 regarding activities 140 between the clients in the manner previously discussed. The activity data 126 may be communicated over the network 108 by a collection module 138 or other suitable functionality of a client 104. Activity data 126 may include data sufficient to enable the calculation of individual activity scores between client pairs or groups by the activity manager module 118 or other suitable functionality of the service provider 102. For instance, the activity data 126 may describe different ways in which a client 104 has interacted with other clients. Additionally or alternatively, the activity data may include individual activity scores between client pairs or groups that have already been computed at the client 104.

In one example, the individual activity scores may be computed based upon closeness ranks assigned to different activities between clients that may be made available via a social network service 120 and/or other service from a service provider 102. In at least some embodiments, different activities may be associated with ranks or weights that are indicative of a perceived closeness between clients that mutually engage in the activities. For example, a client pair that shares videos may be considered relatively closer than client pairs that just share pictures. In another example, clients that include each other on respective favorite contacts lists may be considered relatively closer than other clients that are just friends. The perceived closeness that is associated with different activities may be used to construct a closeness scale that assigns relative ranks to the different activities. The closeness scale in turn may be employed as a basis for determining activity scores that indicate the closeness of a client pair (e.g. a first client 104 and a second client 106), one to another.

In general, a suitable closeness scale may be defined in a variety of ways to rank closeness of activities one to another and may include a variety of activities that may be available in a social networking context, as well as in connection with other resources 116 available from a service provider 102. To further illustrate, consider the following example of a closeness scale that is but one example of a suitable closeness scale that may defined to implement the described techniques. In particular, the following table depicts a closeness scale that is based upon different activities in which clients may choose to engage in through one or more services from a service provider 102.

TABLE 1

Example Closeness Scale

| Activity | Relative Closeness Rank |
| --- | --- |
| No interaction | 0 |
| Email | 1 |
| Instant messages | 2 |
| Sharing pictures | 3 |
| Sharing videos | 4 |
| Audio chat | 5 |
| Video chat | 6 |
| Favorites list inclusion | 7 |

In Table 1 above, each activity is assigned a corresponding rank that indicates the perceived closeness of clients that mutually engage in the activity. The example closeness scale may relate to activities within a social network, such as using the social network service 120. A closeness scale may also be defined for activities across multiple services associated with one or multiple service providers 102. Naturally, different scales may be defined for different networks, services, and/or providers. The particular activities, as well as the number of activities selected, may change for different scales. Moreover, the ranks assigned to particular activities may change within different scales to tailor the scales to particular characteristics of corresponding networks and/or services for which the different scales are defined.

Activities selected for a closeness scale may include different forms of communication (e.g., email, chat, texting, in network notifications, instant messaging) as well as other activities, such as becoming "fans" of each other, addition to favorites lists, tagging, and so forth. Thus, activity data 126 that is obtained from clients can be based upon a corresponding closeness scale comparable to the example scale in Table 1.

A closeness score corresponding to two subject clients is computed based upon the activity data obtained from multiple clients (block 304). For instance, a closeness score as described previously may be computed to when a first client 104 attempts to send an invite to a second client 106. For example, a client "Hallie" may send an invite seeking to become friends with another client "Mia." In this example, the subject clients may be considered potential friends. The closeness score that is computed for Mia and Hallie may be used to determine whether the invite is permitted. If Mia and Hallie are not sufficiently "close," the invite from Hallie may be blocked so that Mia does not even receive the invite. In other words, invites may be blocked for clients that do not have a sufficient closeness score between them. This approach may assist in prevention of invite abuse by malicious parties.

The closeness score between potential friends (e.g., two arbitrary clients/users of the social network service 120 or other service) may be determined using activity data 126 that describes activities of other clients with which the potential friends may already have relationships. The potential friends may represent clients that do not interact directly and therefore would be assigned an activity score of zero if the closeness scale was applied directly. By connecting the potential friends through other clients, though, activity scores associated with direct interaction between the other clients may be used in a variety of ways to compute a closeness score corresponding to the potential friends. A number of example steps that may occur to compute the closeness score are illustrated in FIG. 3, details of which are described just below.

In particular, one or more connections between the two subject clients are identified though clients that interact directly (Block 306). For instance, the activity manager module 118 may be configured to identify indirect connections between the two subject clients through their direct friends and friends of their friends. To do so, the activity manager module 118 may make use of information from the accounts database 122 that describes friend relationships for various clients in the network. This information enables the activity manager module 118 to logically construct a representation of how clients in the network are related. The representation may be used to identify connections (e.g., paths) between the subject clients 104, 106 through one or more other clients. In other words, the representation may be employed to discover one or more ways in which the subject clients 104, 106 may be linked together by a chain of other clients. On particular example representation of a client network is depicted in FIG. 4.

Referring to FIG. 4, a diagram depicting an example representation of client network 400 is shown. The example client network includes multiple clients 402 represented by circular nodes that are connected based upon relationships between the clients. The clients 402 are connected by lines representing direct connections 404 between the clients. In particular, clients 402 that are friends and/or interact in various activities 140 may be connected by the direct connections 404. Activity scores 406 that are determined as described above and below may be associated with the direct connections 404 and the clients 402 they connect. FIG. 4 also illustrates indirect connections 408 that connect clients 402 through other clients. For instance, the potential friends Mia and Hallie of the preceding example are shown as being connected by an indirect connection 408 that traverses a path through another client "Amanda." Mia and Hallie are also connected by another indirect connection 408 that traverses a path from Mia to "Billy" to "Owen" to "Ellie" and then to Hallie. Accordingly, a representation such as the example depicted in FIG. 4, may be employed by an activity manager module 118 to identify one or more ways in which the subject clients may be connected through other clients. It is noted that, although an graphical representation like the example of FIG. 4 may actually be constructed, in practice a representation in various forms may be employed including but not limited to a logical representation, a graphical representation, structured data, a data table, a relational database, and other suitable forms.

Referring back to FIG. 3, activity scores are ascertained between clients of the multiple clients that interact directly (Block 308). For example, service provider 102 may be configured to ascertain individual activity scores indicative of closeness between client pairs that interact directly using activity data 126 provided by clients. In one example, activity scores may be ascertained for those clients that form the connections between subject clients as identified in block 306, such as determining scores between clients that make up the two indirect connections 408 between the potential friends Mia and Hallie in the preceding example. Additionally or alternatively, activity scores may be determined for each client pair in a network. The activity scores may be determined "on-demand" for particular subject clients and/or may be pre-computed and stored, such as in the account database 122 or other suitable storage. Stored activity scores may be made available for reference by the activity manager module 118 to facilitate analysis of multiple client pairs.

One way that activity scores may be ascertained is by operation of the activity manager module 118 to determine the scores using a closeness scale that may be defined as described above. In this case, the activity manager module 118 may operate to examine activity data 126 to identify activities between two clients 104, 106 and assign an activity score to the two clients 104, 106 according to the closeness scale. This may involve matching identified activities to corresponding ranks from the closeness scale. In one approach, the activity score that is assigned to particular clients may be selected from the closeness scale according to the highest ranked activity in which the clients engage. Additionally or alternatively, activity scores may also be computed by the clients themselves, in which case the activity manager module 118 may be configured to obtain already computed scores directly from the activity data 126.

To further illustrate, consider Table 2 below which depicts example activity scoring for a client "Mia" and some of her friends based upon their mutual activities.

TABLE 2

Example Activity Scoring

| Client | Friend | Activities | Score |
| --- | --- | --- | --- |
| Mia | Billy | email, share pictures | 3 |
| Mia | Colin | email, instant message, video chat | 6 |
| Mia | Sara | email | 1 |

Notice in the above table that the assigned activity scores may be determined using the closeness scale of Table 1 above and the mutual activities of Mia and her friends. The activity scores also correspond to the highest ranked activity in which Mia engages with each friend. For example, Mia and Billy are assigned a score of "3" as sharing pictures is their highest ranked mutual activity. In other words, a higher ranked activity subsumes a lower ranked activity and the assigned scores reflect this. Further, the scores assigned to particular clients are dynamic and will constantly changes as activities between the clients change. For example, if Mia and Billy decide to add each other to their respective favorites lists, then the score for Mia and Billy will change to "7" based on the example closeness scale. In this manner, individual activity scores for clients that interact directly may be ascertained.

The activity scores may be included in a representation of a client network as discussed above. For example, the activity scores for Mia's friends from Table 2, are shown as being associated with corresponding direct connections 404 in the example representation of FIG. 4. Additional activity scores are illustrated as being associated with the other direct connections 404.

Using the ascertained activity scores, candidate values for the closeness score are calculated that correspond to the one or more connections (Block 310). Then, one of the candidate values is selected as the closeness score for the two subject clients (Block 312). For instance, the activity manager module 118 may be configured to calculate candidate values in various ways using the connections established per block 306 and corresponding activity scores ascertained per block 308. The computation of and selection from the candidate values for multiple connections may occur using various techniques.

In general, candidate values may be determined for each connection that links subject clients 104, 106. For Mia and Hallie in the continuing example, candidate values may be determined for both the connection through Amanda and the other connection through Billy, Owen, and Ellie. Candidate values may be arrived at by performing one or more mathematical and/or statistical operations upon the individual activity scores for each connection. For example, operations may include summing the scores, taking an average of the scores, determining a minimum or maximum, and/or combinations thereof. Likewise, once candidate values are computed, one of the values may be selected as a closeness score using various operations including but not limited to averaging the candidate values, taking a minimum, taking a maximum, and so forth. By way of example and not limitation, a few specific examples of approaches that may be employed to arrive at a closeness score are described just below.

In one example approach, candidate values for each the connections are determined by taking the minimum activity score for the connection. In this case, the candidate score reflects the link of the connection that is associated with the least activity. Then, the maximum of the candidate values is selected for the closeness score. The maximum is selected here so that the closeness score reflects that there is a connection that exists between two subject clients 104, 106 that has at least the amount of activity indicated by the maximum value.

To illustrate this approach, consider again the potential friends Mia and Hallie. Using the example representation of FIG. 4, the connection through Amanda has individual activity scores of "4" between Mia and Amanda and "2" between Amanda and Hallie. Thus, the minimum value for this connection is "2". For the other connection, the individual activity scores are "3" between Mia and Billy, "2" between Billy and Owen, "3" between Owen and Ellie, and "1" between Ellie and Hallie. Thus, the minimum value for this connection is "1." The maximum value of "2" for these two connections is therefore selected as the closeness score using this approach.

In another example approach, candidate values for each the connection are determined by taking an average of activity scores associated with the connections. Then, the maximum of the candidate values is again selected for the closeness score. In this case, the candidate scores differentiate between connections that may have the same minimum activity score by considering the other activity scores associated with the connection. In effect, this approach gives more weight to scores that indicate a lot of activity along one connection relative to another connection.

Applying this approach to the potential friends Mia and Hallie produces an average individual activity score of "3" for the connection through Amanda. For the other connection, the average of the individual activity scores is "2" (rounded to the nearest integer). The maximum value of "3" for these average values is therefore selected as the closeness score using this approach.

Naturally, numerous other suitable approaches for calculating closeness scores using similar principles are contemplated that may be employed for use in different scenarios and with different kinds of social networks, providers, and resources.

Interaction of the two subject clients is controlled based upon the computed score (Block 314). For instance, the activity manager module 118 may be implemented to selectively enable or disable activities between clients 104, 106 based upon a closeness score that is computed for the clients 104, 106. This may include blocking or allowing invites from one client to another based on the closeness score and using the closeness score to differentiate between clients, examples of which were discussed in relation to FIG. 2. It is noted that the closeness score assigned to clients that interact directly may be the same as the activity score determined for the clients as described previously.

Thus, the closeness scores determined as described herein may be used to selectively block invitations and other activities between clients that are less likely to be legitimate friends. A higher closeness score between clients indicates that the clients are connected by a trust relationship as a result of being linked by friends that engage in higher ranked mutual activities. Blocking activities between clients that have lower closeness scores may cause invites/content from spammers and other malicious parties to be blocked more frequently.

To implement the blocking, threshold values for the closeness score may be established and assigned to activities to control when invites and/or other activities are blocked or allowed. The threshold values may be defined at the network level by a service provider 102 and may be different for different client networks and/or resources. The activity manager module 118 may check a closeness score associated with clients against the threshold values and selectively enable or disable different individual activities accordingly depending upon whether the closeness score satisfies the thresholds established for the different activities. Different thresholds may be associated with different activities and may be used to individually control the activities. For example, a closeness score of "3" may be defined as sufficient to enable clients to email, send invites, and view each other profile information. A closeness score of "1" may be defined to enable an invite between clients, but restrict other activities. A closeness score of "0" indicates that no trust relationship exists between clients and accordingly activity manager module 118 may strictly limit or prevent activities between clients at this level.

Note that clients that are new to the network may not initially have any friends and thus may not have any relationships that may be used to determine closeness scores. Activity manager module 118 may be configured to handle first time clients in a number of ways. In one approach, the system may be configured to allow a small number of seed invites and/or activities to take place before testing for closeness scores. The number of seed invites and/or activities that are permitted may be different for different social networks. This approach enables new clients at least some time to establish legitimate relationships. In a more sophisticated approach, the relevance of closeness score may be progressively increased for a client as more friends are added. For example, closeness scores may not be considered when a client interacts to invite a first friend. For the 2nd to the 5th friends, a threshold for the closeness score may be set at an intermediate level. This intermediate level may enable the client to become friends with the friends of the first friend. For subsequent friends, the closeness threshold may be set to the level defined for the particular network.

The activity manager module 118 may be further configured to handle compromised accounts. For example, an account associated with a legitimate user may be taken over by an attacker in a phishing scam or may otherwise be compromised such that the account may be controlled by another party. In this case, the other party may be a spammer that uses the account to send out spam. Accordingly, the activity manager module 118 may be configured to detect compromised accounts. To do so, the system may keep a history of interactions for accounts. A sudden change in the amount or types of activities for an account may be indicative of a compromised account. In one approach, usage habits corresponding to accounts may be monitored and a history may be frequently updated. Sudden changes for an account may be triggers that cause the system to take responsive actions including but not limited to increasing monitoring for the account, changing thresholds for the account to make spamming more difficult, and/or blocking the compromised account. This adds a further layer of protection to put additional barriers in place that make spamming more difficult.

Having considered examples techniques related to invite abuse prevention, consider now example systems that may be employed to provide techniques for invite abuse prevention in one or more embodiments.

Example System

Figure 5:
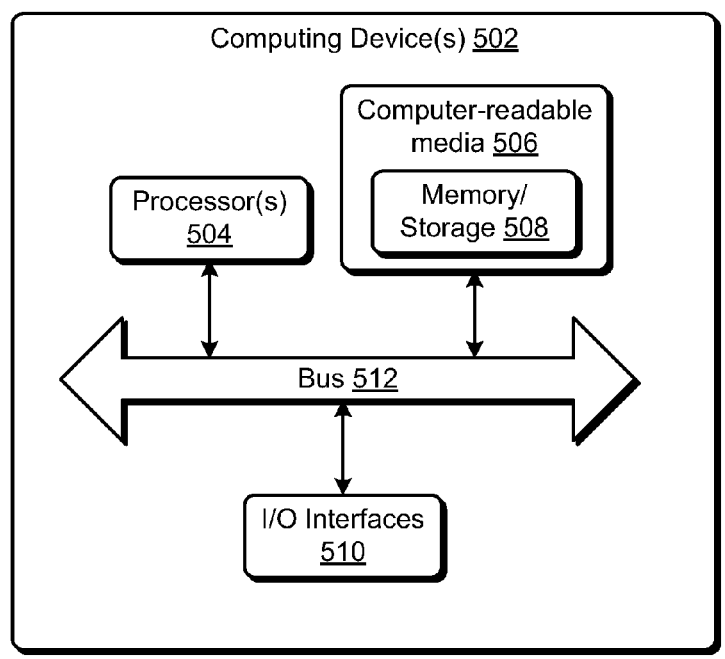
FIG. 5 is an illustration of an example computing system in accordance with one or more embodiments.

FIG. 5 illustrates an example system generally at 500 that includes an example computing device 502 that is representative of one or more such computing systems and/or devices that can implement the various embodiments described above. The computing device 502 may be, for example, a server of a service provider 102, a device associated with the client 104, an on-chip system, and/or any other suitable computing device or computing system.

The example computing device 502 includes one or more processors 504 or processing units, one or more computer-readable media 506 which can include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices can be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 can include wired and/or wireless buses.

The memory/storage component 508 represents memory/storage capacity associated with one or more computer-readable media. The memory/storage component 508 can include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media can include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of a integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 108. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the activity manager module 118, communication module 136, collection module 138, resource manager 114, and other program modules, may be embodied as one or more instructions and/or logic embodied on some form of computer-readable media.

Accordingly, particular modules, functionality, components, and techniques described herein may be implemented in software, hardware, firmware and/or combinations thereof. The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques for invite abuse prevention, as well as other techniques. Such techniques include, but are not limited to, the example procedures described herein. Thus, computer-readable media may be configured to store or otherwise provide instructions that, when executed by one or more devices described herein, cause various techniques for invite abuse prevention.

CONCLUSION

Although invite abuse prevention techniques have been described in language specific to structural features and/or methodological acts, it is to be understood that the appended claims are not necessarily limited to the specific features or acts described. Rather, the specific features and acts are disclosed as example forms of implementing the invite abuse prevention techniques.

What is claimed is:

1. A method implemented by a computing system of a social networking service, comprising: obtaining activity data from multiple client devices in a social network that describes mutual online direct interaction engaged in by the multiple client devices with respect to other clients in the social network; calculating a closeness score for a first client and a second client that use the social network service; based on the activity data obtained from the multiple client devices in accordance with a closeness scale that assigns relative ranks to different types of online activities conducted as part of the online direct interaction via the social network each of the relative ranks being assigned according to a determined closeness of each to one of the different types of online activities including activities offered by the social network, and the closeness score being calculated by the computing system; and utilizing the calculated closeness score to control social network activities between said clients.

2. A method as described in claim 1, wherein calculating the closeness score comprises:
    matching the online direct interaction to corresponding ranks from the closeness scale that assigns the relative ranks to the different types of online activities according to the determined closeness of the activities; and
    selecting the closeness score to correspond to a highest ranked activity that is matched.

3. A method as described in claim 1, wherein utilizing the calculated closeness score comprises selectively blocking or allowing an invite between said clients based on the calculated closeness score.

4. A method as described in claim 1, wherein utilizing the calculated closeness score comprises:
    including the second client in a group of closest friends of the first client based upon the calculated closeness score;
    arranging one or more portions of a user interface configured to provide the social network service to the first client to differentiate between information from the closest friends of the first client and information from other friends.

5. A method as described in claim 1, wherein utilizing the calculated closeness score comprises configuring an update feed provided to the first client via the social network service to enable selective filtering of information in the update feed from the second client based on the calculated closeness score.

6. A method as described in claim 1, wherein the calculating and utilizing are performed via an activity manager implemented by the service provider using activity data that is obtained over a network from said clients.

7. A method as described in claim 1, wherein the calculating and utilizing are performed via a collection module implemented by one of said clients using activity data that is collected by the one of said clients.

8. One or more computer-readable storage media devices having instructions stored thereon that, responsive to execution by a computing system, of a social network service, causes the computing system to implement an activity manager to perform operations comprising: obtaining activity data from multiple client devices in a social network that describes mutual online direct interaction engaged in by the multiple client devices with respect to other clients in the social network; computing a closeness score for two subject clients that use the social networking service, based upon the activity data obtained from the multiple client devices in accordance with a closeness scale that assigns relative ranks to different types of online activities conducted as part of the online direct interaction, the relative ranks being assigned according to a determined closeness of each of the different types of online activities including activities offered by the social network, the closeness score being computed by the computing system; and controlling interaction of the two subject clients based upon the closeness score.

9. One or more computer-readable storage media devices as described in claim 8, wherein computing the closeness score for the two subject clients comprises:
identifying one or more connections between the two subject clients through clients of the multiple client devices that interact directly;
ascertaining activity scores between the clients of the multiple client devices that interact directly;
calculating candidate values for the closeness score that correspond to each of the one or more connections using the ascertained activity scores; and
selecting one of the candidate values as the closeness score for the two subject clients.

10. One or more computer-readable storage media devices as described in claim 9, wherein ascertaining the activity scores between the clients of the multiple client devices that interact directly comprises, for each pair of said clients:
matching the mutual online direct interaction of the client pair to corresponding ranks from the closeness scale that assigns the relative ranks to the different online activities according to a perceived closeness of the activities; and
selecting an activity score for the client pair to correspond to a highest ranked activity that is matched.

11. One or more computer-readable storage media devices as described in claim 8, wherein the social network corresponds to a social network service from a service provider.

12. One or more computer-readable storage media devices as described in claim 8, wherein computing the closeness score for the two subject clients comprises:
identifying one or more connections between the two subject clients through clients of the multiple client devices that interact directly;
calculating candidate values for the closeness score as minimums of activity scores associated with client pairs of the multiple client devices in each of the one or more connections;
selecting a maximum of the candidate values as the closeness score.

13. One or more computer-readable storage media devices as described in claim 8, wherein computing the closeness score for the two subject clients comprises:
identifying one or more connections between the two subject clients through clients of the multiple client devices that interact directly;
calculating candidate values for the closeness score as averages of activity scores associated with client pairs of the multiple client devices in each of the one or more connections;
selecting a maximum of the candidate values as the closeness score.

14. One or more computer-readable storage media devices as described in claim 8, wherein controlling interaction of the two subject clients based upon the closeness score includes selectively blocking or allowing an invite between the two subject clients to become friends in the social network based on the closeness score.

15. One or more computer-readable storage media devices as described in claim 8, wherein controlling interaction of the two subject clients based upon the closeness score includes:
assigning threshold values for closeness to different online direct interaction available within the social network; and
enabling or disabling the different activities for the two subject clients depending upon whether the closeness score satisfies the thresholds established for the different activities.

16. A system, of a social networking service, comprising: one or more processors; and one or more computer-readable storage media storing instructions that, when executed via the one or more processors, cause the one or more processors to implement an activity manager configured to perform acts to compute a closeness score for two subject clients that use the social networking service, including:
obtaining activity data from multiple clients that use a social network service from a service provider, the activity data describing mutual online direct interaction engaged in by the multiple clients with respect to other clients of the social network service; identifying one or more connections between the two subject clients through clients of the multiple clients that interact directly in online activities;
ascertaining activity scores between the clients of the multiple clients that interact directly based on a closeness scale that assigns relative ranks to different types of online activities conducted as part of the online direct interaction, the relative ranks being assigned according to a determined closeness of each of the different types of online activities including activities offered by the social network;
calculating candidate values for the closeness score that correspond to each of the one or more connections using the ascertained activity scores, the candidate values being calculated by performing one or more mathematical or statistical operations upon the ascertained activity scores individually for each of the one or more connections;
selecting one of the candidate values as the closeness score for the two subject clients; and
controlling interaction of the two subject clients based upon the closeness score, including selectively blocking or allowing an invite between the two subject clients based on the closeness score.

17. A system as described in claim 16, wherein selecting one of the candidate values as the closeness score comprises selecting a maximum of the candidate values.

18. A system as described in claim 17, wherein calculating candidate values comprises determining average values of the ascertained activity scores corresponding to each of the one or more connections.

19. A system as described in claim 17, wherein calculating candidate values comprises determining minimum values of the ascertained activity scores corresponding to each of the one or more connections between the two subject clients.

20. A system as described in claim 16, wherein controlling interaction of the two subject clients based upon the closeness score further comprises selectively enabling or disabling one or more individual activities made available via the social network service for the two subject clients according to whether the closeness score satisfies threshold values assigned to the one or more individual activities.

* * * * *